United States Patent
Berliner

(10) Patent No.: US 7,021,636 B1
(45) Date of Patent: Apr. 4, 2006

(54) CONVERTIBLE COASTER/SLED WITH STEERING/BRAKING HANDLEBAR

(76) Inventor: Oliver Berliner, 22613 River Ridge Rd., Bozman, MD (US) 21612

(*) Notice: Subject to any disclaimer, the term of this patent is extended or adjusted under 35 U.S.C. 154(b) by 0 days.

(21) Appl. No.: 10/787,877

(22) Filed: Feb. 27, 2004

(51) Int. Cl.
*B62B 19/04* (2006.01)

(52) U.S. Cl. .......................... 280/7.14; 280/15; 280/8; 280/10; 280/7.12; 280/14; 280/13

(58) Field of Classification Search ............ 280/87.01, 280/87.021, 28, 21.1, 16, 15, 287.13, 8, 10, 280/7.1, 7.12
See application file for complete search history.

(56) References Cited

U.S. PATENT DOCUMENTS

| | | | |
|---|---|---|---|
| 3,226,130 A | * | 12/1965 | Smith .......................... 280/22 |
| 4,244,593 A | * | 1/1981 | Malone .......................... 280/8 |
| 4,337,957 A | * | 7/1982 | Heine .......................... 280/7.14 |

* cited by examiner

*Primary Examiner*—Christopher P. Ellis
*Assistant Examiner*—Cynthia F. Collado
(74) *Attorney, Agent, or Firm*—J. E. McTaggart

(57) ABSTRACT

A typically one-rider non-powered sports/recreational vehicle has a main body that can be easily converted between a wheeled coaster-wagon configuration and a snow-sled configuration with runners. Typically there are four wheels or four runners: two at front, steerable from a handlebar, and two fixed at rear. For braking in the coaster-wagon configuration, a pair of brake shoe pads, attached to the handlebar, press against the front tires to act as brake shoes when the handlebar is twisted radially via a pair of user handgrips. In the snow-sled configuration, a braking panel, attached centrally on the handlebar, moves downwardly to brake by engaging oncoming snow. In normal use as a coaster or sled, when not braking, this braking panel is nested in an unobtrusive location immediately beneath the front of the main body platform, retained there by spring action that also provides braking hold-off in the coaster-wagon configuration.

8 Claims, 3 Drawing Sheets

CONVERTIBLE COASTER/SLED WITH STEERING/BRAKING HANDLEBAR

FIELD OF THE INVENTION

The present invention relates to the field of non-powered personal sports and recreational vehicles and more particularly to such vehicles with capability of conversion between a snow-sled configuration and a wheeled coaster-wagon configuration.

BACKGROUND OF THE INVENTION

Non-powered sleds and coaster-wagons have been known for many years as separate personal sports and recreational sports vehicles, especially for youngsters, and typically, due to their inherent seasonal usage, many sleds take up valuable storage space while wagons are in use, and vice-versa. Such vehicles are often equipped with steering capability, typically via a front pair of wheels on a personal wagon or, less frequently via front runners of a large snow-sled; however, while combined steering and braking control has been known on coaster-wagons, braking on snow-sleds is virtually unknown and unavailable.

DISCUSSION OF KNOWN ART

A popular type of one-rider children's snow-sled is configured with a centrally-pivoted transverse manual steering handle near the front, made and arranged to bend metal runners in a manner to provide a very limited range of steering capability.

Convertible coaster/sleds have been proposed, but typically do not include a brake, even for the coaster-wagon mode. Where a brake is provided it typically operates separate from the steering and braking is provided only in the coaster-wagon mode, not in the snow-sled mode.

Thus conventional children's sleds have tended to lack braking and to provide only minimal steering capability.

OBJECTS OF THE INVENTION

It is a primary object of the present invention to provide a dual mode recreational vehicle, primarily for one rider, that is readily convertible between a coaster-wagon configuration with wheels and a snow-sled configuration with runners.

It is a further object to provide improved steering capability and braking capability, both operable and functional in both the coaster-wagon configuration and the snow-sled configuration.

It is a further object to provide an integrated steering and braking system that enables the rider to operate both steering and the braking in both the coaster-wagon configuration and the snow-sled configuration from a single user control element.

SUMMARY OF THE INVENTION

The foregoing objects have been met in the invention of a typically personal non-powered sports/recreational vehicle with a main body that can be easily converted between a wheeled coaster-wagon configuration and a snow-sled configuration with runners. Typically there are four wheels or four runners: two at front steerable from a pair of user handgrips of a handlebar and two fixed at rear. For braking in the coaster-wagon configuration, a pair of brake shoe pads, attached to the handlebar, press against the front tires to act as brake shoes when the handlebar is twisted radially via the handgrips. In the snow-sled configuration, a braking panel, attached centrally on the handlebar, moves downwardly to brake by engaging oncoming snow. In normal use as a coaster or sled, when not braking, this braking panel is nested in an unobtrusive location immediately beneath the front deck region, retained there by spring action that also provides braking hold-off in the coaster-wagon configuration.

DETAILED DESCRIPTION

Figure 1:
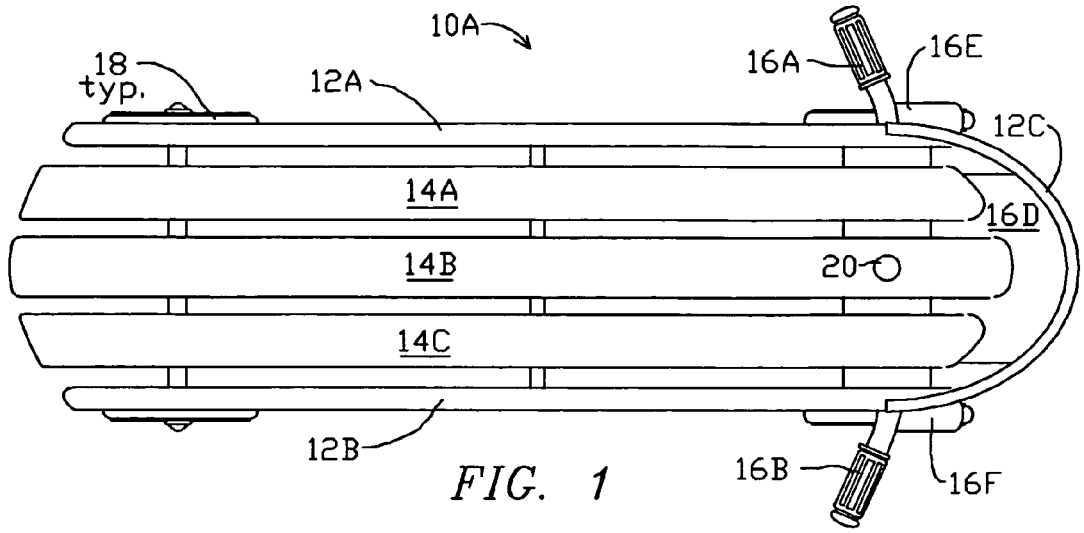
FIG. 1 is a plan view of a convertible vehicle of the present invention in the coaster-wagon configuration, equipped with four wheels.

In FIG. 1, a convertible vehicle of the present invention is shown in plan view in a coaster-wagon configuration 10A having a main body with a pair of straight side rails 12A and 12B, a curved front rail 12C, three deck panels 14A, 14B and 14C, a pair of handgrips 16A and 16B, and a set of four identical wheels 18, two at front and two at the rear.

A handlebar assembly includes handgrips 16A and 16B fitted to the ends of a transverse metal handlebar to which are attached a pair of coaster brake pads 16E and 16F at wheel locations and, optionally, a snow-sled brake panel 16D. The handlebar assembly is part of a front carriage steering assembly that is mounted pivotally by a pivot bolt 20 to the main body of the vehicle and that carries a front axle for the front pair of wheels 18.

Figure 2:
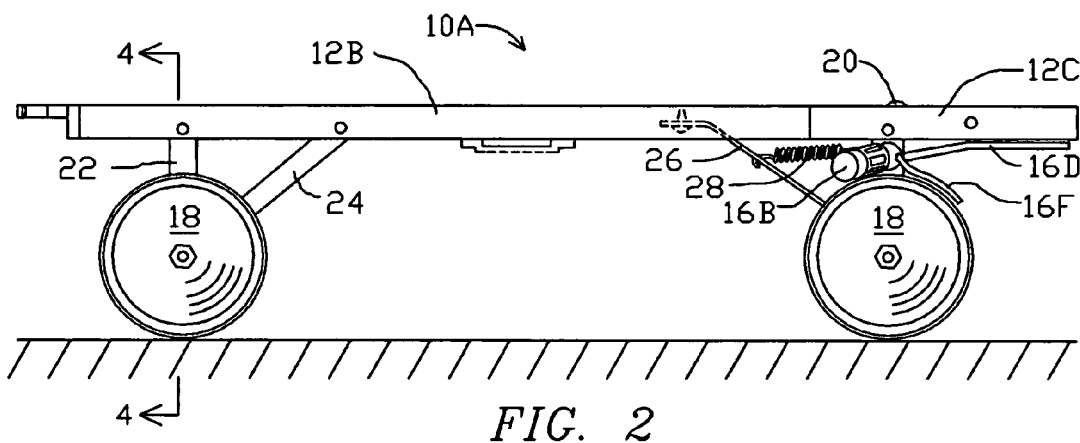
FIG. 2 is a side elevation of the vehicle of FIG. 1.

FIG. 2 is a side elevation of the coaster-wagon 10A of FIG. 1 showing the two right hand side wheels 18. The front carriage steering assembly receives support by a central diagonal brace member 26. The transverse handlebar is attached to the steerable front carriage assembly in such a manner that, in addition to turning the front carriage assembly for steering, it can be oriented axially by the user for braking by a clockwise twisting action such that the ends of handgrips, e.g. the left hand end of handgrip 16B as shown, move upwardly.

At the rear of the vehicle, wheels 18 rotate on an axle supported by inverted-U-shaped bracket 22 which receives support from a pair of diagonal brace members 24, one on each side, fastened to side rails 12A and 12B.

A coil spring 28 has one end hooked into an opening in brace member 26 and the other end attached to the handlebar assembly in a manner to exert torque in a counterclockwise direction (as viewed here) to hold the orientation of handgrip 16B, coaster brake pad 16F, and sled brake panel 16D as shown, until actuated by the user by twisting to apply braking. A single spring 28 would be attached centrally to the handlebar, i.e. close to the pivot point of the front carriage to minimize the effect on steering. Alternatively, and preferably, two coil springs 28 can be incorporated and attached to the handlebar assembly, offset to opposite sides from center, so to provide a balanced arrangement that automatically returns the steering to a centered neutral position as the default condition in the absence of any user-exerted force applied to the handgrips 16A and 16B. Thus the coil springs 28 act automatically in default, i.e. in the absence of force applied to the handlebar by the user, to perform two separate and different functions: brake hold-off and steering-centering.

Figures 3, 4:
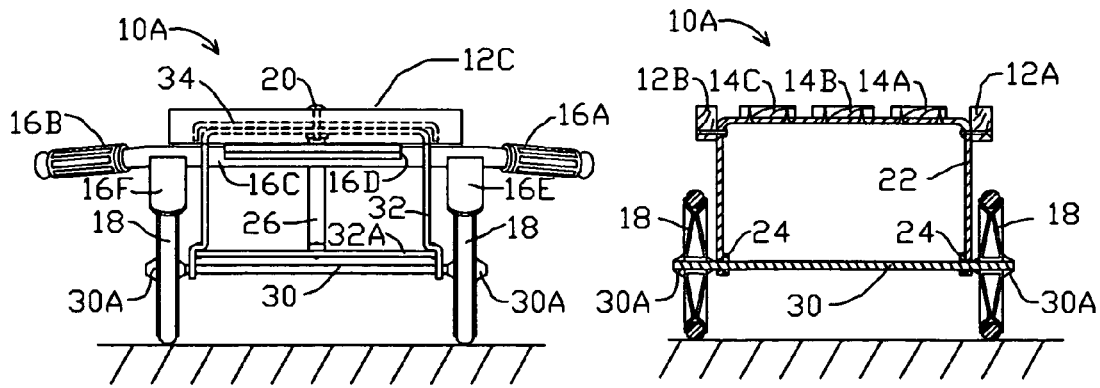
FIG. 3 is a front elevation of the vehicle of FIGS. 1 and 2.
FIG. 4 is a cross-section taken through axis 4—4 of FIG. 2.

In FIG. 3, the front elevation of the vehicle of FIGS. 1 and 2, handlebar 16C is seen along with handgrips 16A and 16B, coaster brake pads 16E and 16F and sled brake panel 16D which in a substantially horizontal orientation. The front carriage steering assembly is seen including the two front wheels 18, axle 30 traversing "axle" holes in the two legs of the main inverted-U-shaped bracket 32, and, immediately above axle 30, a reinforcing cross-brace 32A, attached pivotally to diagonal brace 26. The top side of bracket 32, retained by pivot bolt 20, bears rotatably against a metal plate 34 which is attached to the underside of the top deck of the vehicle near the front end, behind front rail 12C. The four wheels 18 are each retained by an ornamental nut 30A, typically an "acorn" type cap nut, threaded onto each end of the two axles 30.

FIG. 4 is a cross-section taken through axis 4—4 of FIG. 2, showing rear wheels 18 with axle 30 mounted through bearing holes in inverted-U-shaped bracket 22 and its diagonal supports 24. Attached to the top region of bracket 22 are seen the two side rails 12A and 12B and the three deck panels 14A, 14B and 14C.

In an easy conversion from the coaster-wagon configuration 10A to the snow-sled configuration, the four wheels 18 are removed and replaced by four snow-sled runner units: a front pair and a rear pair, by simple removal and reinstallation of the four ornamental nuts 30A.

Figure 5:
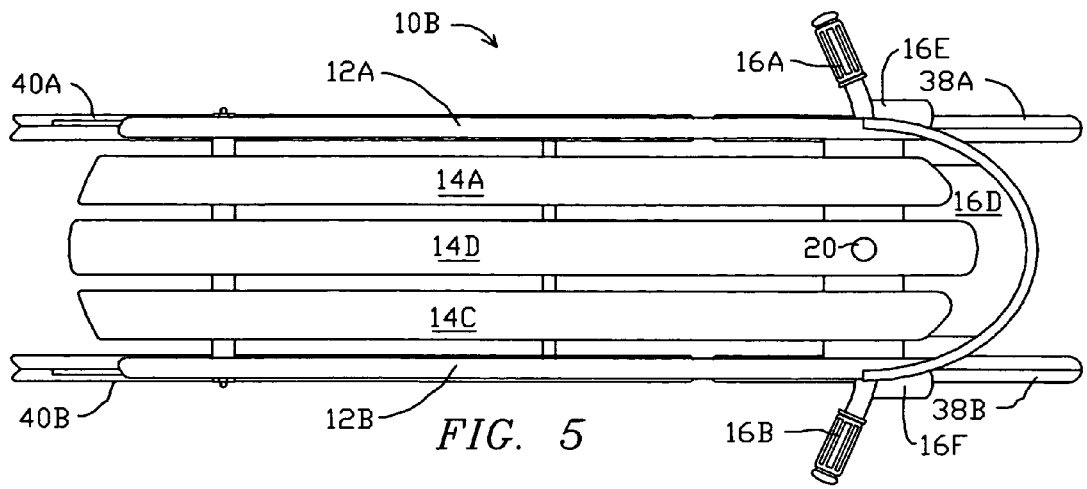
FIG. 5 is a plan view of a vehicle of the present invention in the snow-sled configuration, equipped with four runners.

FIG. 5 is a plan view of the vehicle of the present invention after conversion to the snow-sled configuration 10B, equipped with four runner units: 38A and 38B at the front and 40A and 40B at the rear.

Figure 6:
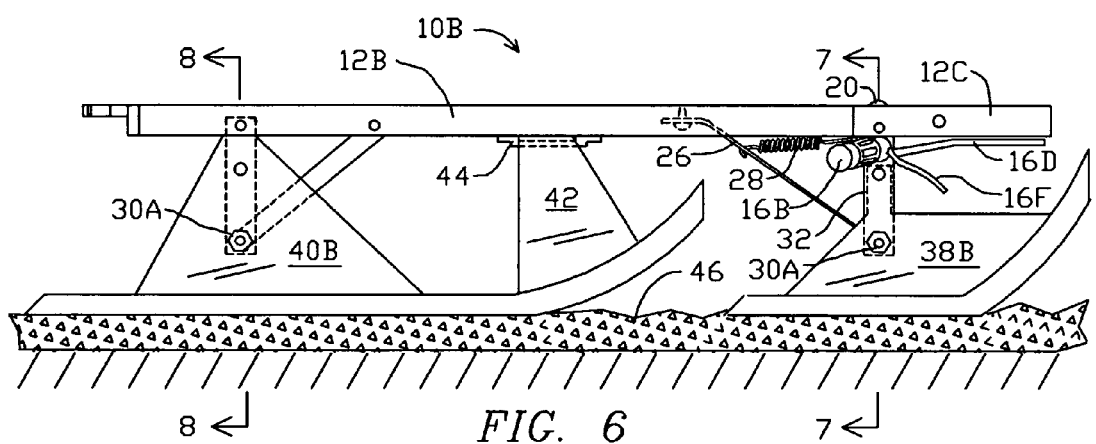
FIG. 6 is a side elevation of the vehicle of FIG. 5.

FIG. 6 is a side elevation of the subject matter of FIG. 5 showing the right front runner unit 38B and the right rear runner unit 40B, retained by nuts 30A and riding on ground covered by a layer of snow 46. The rear runner unit 40B includes a main vertical triangular strut portion that engages the rear axle, and an auxiliary vertical forward strut portion 42 configured at top with a horizontal inwardly-facing tab that is retained in a slot opening provided by a U-shaped bracket 44 attached to the underside of right handrail member 12B.

Figure 7:
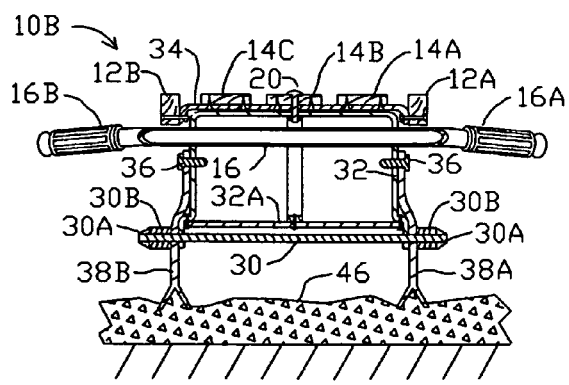
FIG. 7 is a cross-section of the primary snow-sled configuration taken through axis 7—7 of FIG. 6.

FIG. 7, a cross-section taken through axis 7—7 of FIG. 6, shows handlebar 16 passing through holes that serve as bearings at both sides of inverted-U-shaped bracket 32, and shows the vertical strut region of front runners 38A and 38B retained against bracket 32 by ornamental nuts 30A and spacers 30B.

Since the axle 30 must be made long enough to accommodate the thickness of the hubs of wheels 18 (refer to FIG. 4), which is greater than the thickness of the runner units 38A,B (and 40A,B, FIG. 8), the snow-sled configuration 10B requires tubular spacers 30B at the ends of the axles 30 between the nut 30A and the corresponding runner unit. Spacers 30B may be deployed as separate items, or they may be each permanently attached to the corresponding runner unit.

Front runner units 38A and 38B are shaped with an inward offset to conform with the shape of bracket 32 and are further retained by fixed studs 36, near the top of the strut, engaging mating holes provided in bracket 32.

Figure 8:
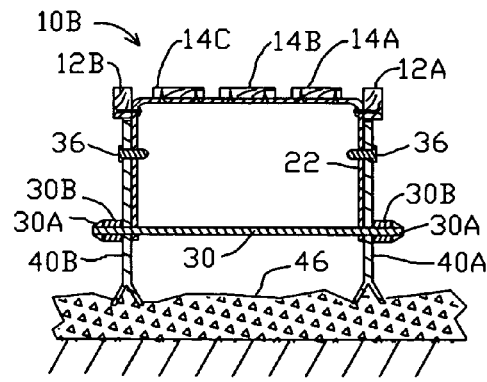
FIG. 8 is a cross-section of the primary snow-sled configuration taken through axis 8—8 of FIG. 6.

FIG. 8, a cross-section taken through axis 8—8 of FIG. 6, shows the rear runner units 40A and 40B retained on rear axle 30 by nuts 30A and spacers 30B, and retained near the top of the vertical strut by fixed studs 36 engaging mating holes provided in bracket 22, in generally the same manner as in the front runner units.

Figure 9:
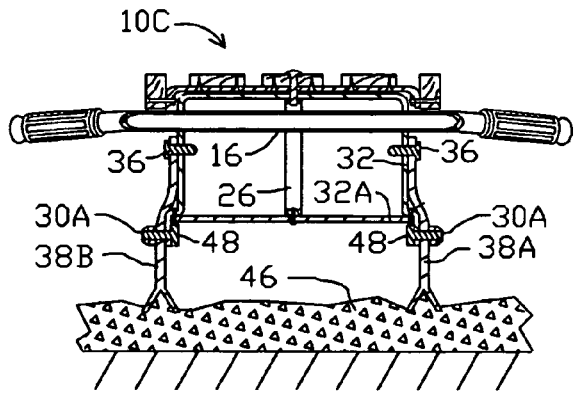
FIG. 9 is a cross-section of a secondary (axle-removed) snow-sled configuration taken through axis 7—7 of FIG. 6.
Figure 10:
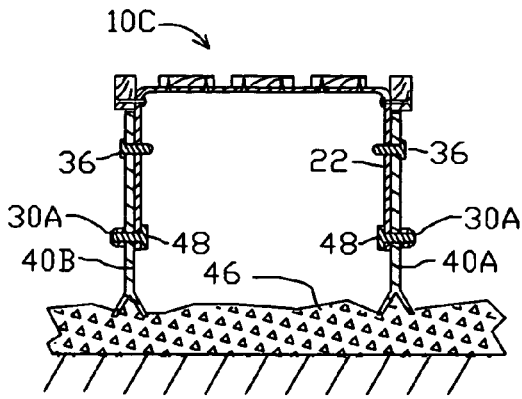
FIG. 10 is a cross-section of the secondary snow-sled configuration taken through axis 8—8 of FIG. 6.

FIGS. 9 and 10 are cross-sections taken through axis 7—7 and axis 8—8 of FIG. 6 respectively, showing an alternative snow-sled configuration 10C wherein the two axles are removed in the conversion, and the runner units 38A,B (FIG. 9) and 40A,B (FIG. 10) are each attached by a machine bolt 48 traversing the holes vacated by removal of the axles and each retained by a nut 30A, which may be the same ornamental nut that retains the wheels in the coaster-wagon configuration 12A, Bolts 48 are preferably made with a large square head to avoid the need for holding with a second wrench while tightening nut 30A.

Compared to snow-sled configuration 10B, the absence of axles in configuration 10C offers the advantages of reducing potential drag by the axles in deep snow, eliminating the need for spacers 30B, and eliminating the surplus axle-end extensions (see FIGS. 7,8). However, as disadvantages, conversion requires removal/installation of the two axles, and bolts 48 must be procured, handled and stored as loose standby items along with the runner-units during seasons when the vehicle is in the coaster-wagon configuration.

Figure 11:
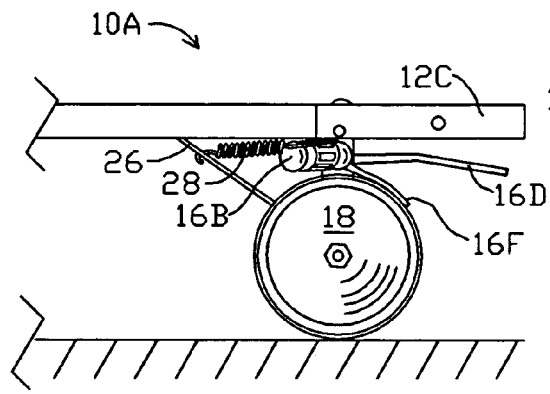
FIG. 11 is a side elevation of the front portion of the vehicle of FIGS. 1–4 showing braking applied in the coaster-wagon configuration.

FIGS. 11–14 illustrate the implementation of braking in the coaster-wagon configuration 10A and in the snow-sled configurations 10B and 10C FIG. 11 is a side elevation of the front portion of the vehicle 10A of FIGS. 1–4 showing braking applied in the coaster-wagon configuration 10A. Torque applied by the user in a clockwise direction, as viewed here, has pressed the brake pad 16F against the outer tire portion of wheel 18 to as to apply frictional braking to both front wheels. The axial rotation of the handlebar, against the tension of spring 28, has moved the sled brake panel 16D to a position slightly separated from the front rail 12C as shown.

Figure 12:
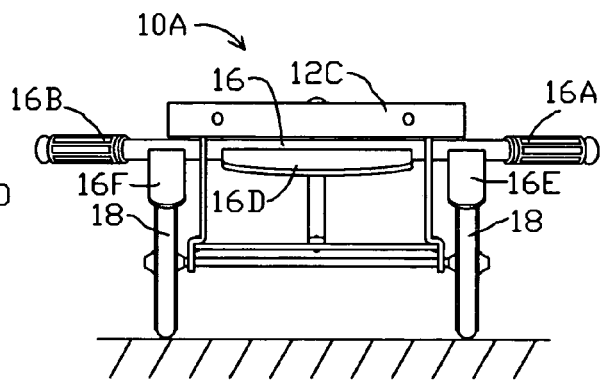
FIG. 12 is a front elevation of the subject matter of FIG. 11.

FIG. 12, a front elevation of the subject matter of FIG. 11, shows that when braking is applied to the front wheels 18 by pads 16E and 16F, the rotation of handlebar 16 has raised the handgrips 16A and 16B to approximately a horizontal position as seen in this view (and in FIG. 9) from their normal slightly downward default orientation with braking released as seen in FIGS. 2,3,6 and 7. The small downward displacement of snow-sled brake panel 16D as seen in FIG. 10 imposes no practical effect on the utilization of the vehicle in its coaster-wagon configuration.

Figure 13:
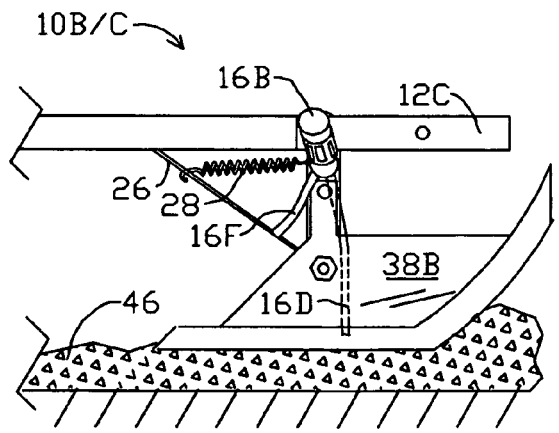
FIG. 13 is a side elevation of the front portion of the vehicle of FIGS. 5–8 showing braking applied in the snow-sled configuration.

FIG. 13 shows a side elevation of the front portion of the snow-sled of FIGS. 5–10 showing how braking is applied in the snow-sled configurations 10B and 10C. With considerable further clockwise rotation of the handlebar 16, the handgrips 16A and 16B are seen as being inclined upward to near their highest position, and sled brake panel 16D is now seen to extend well below the level of the axle holes, where it slows the sled by engaging oncoming snow, which will tend to build up and form a pack at the front of the sled.

Figure 14:
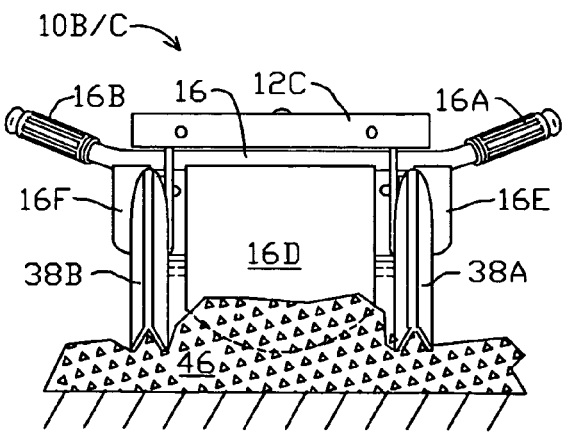
FIG. 14 is a front elevation of the subject matter of FIG. 13.

FIG. 14 shows a front elevation of the subject matter of FIG. 13. Apart from the presence/absence of small axle segments in this view, FIG. 14 applies to both snow-sled configurations 10B and 10C.

The shape of sled brake panel 16D as shown corresponds with the shape of the front rail 12C (FIGS. 1,5) so that, in normal use, panel 16D is largely concealed, except for when braking is applied by the user in the snow-sled configuration. Functionally, the invention could be practiced with the brake panel 16D and/or the front rail 12C made in a different size and/or shape, as a matter of design choice. It may be possible to form pads 16E and 16F together with sled brake panel 16D from a single plate of metal.

The two holes shown in front rail 12C in FIGS. 12 and 14 are provided for optional deployment of a pull-rope (not shown) in the wagon configuration 10A or in either sled configuration 10B of 10C. The end of the pull-rope would be inserted through these holes and knotted behind front rail 12C for retention.

There are other options whereby the invention could be practiced, for example with more complex fastening methods and/or additional hardware for fastening the axles and/or the runners. As an alternative, the sled brake panel 16D (FIGS. 2,6,10,12) could be made user-removable and/or made in a different size and/or shape.

The invention could be practiced with the ends of the handlebar 16C and handgrips 16A and 16B shaped and positioned other than shown and described above; e.g. if the handlebar is bent at the ends to make the handgrips substantially perpendicular to central portion of the handlebar and oriented upwardly as the default position, this would allow braking to be applied by pushing the handgrips forward and downward, which could be done either by the hands or the feet of the user, or even by one hand or foot.

The convertible coaster/sled can be considered as three packages; a first conversion package including four wheels 18, the main package consisting of the main body that would remain after removing the wheels from the coaster-wagon configuration, and a second conversion package including the four runner units which are added to convert the main body into the snow-sled configuration. As an alternative to producing the subject of the invention as a totally new product, the concept envisioned and the structure of the illustrative embodiment described above holds open the possibility of implementing the invention as a modification/improvement based on starting with a known coaster-wagon product. For example U.S. Pat. No. 2,103,998 to inventor F. G. Birkhead discloses a WHEELED COASTER that could possibly serve as the main body and the first conversion package, to be supplemented by the addition of the items of the second conversion package to fully implement the convertible coaster-sled of the present invention The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A convertible coaster/sled that can be readily converted between a coaster-wagon configuration with wheels and a snow-sled configuration with runners, comprising:
   a main body, configured for use as a coaster-wagon and as a snow-sled, provided with a fixed rear axle support assembly including a rear axle, and a steerable front axle support assembly including a front axle and made to be steerable via a single user control element that is also made and arranged to provide braking in at least the coaster-wagon configuration;
   a first conversion package including four wheels made to be operationally compatible with the rear and front axles so as to constitute the coaster-wagon configuration; and
   a second conversion package including a pair of front runner units, a pair of rear runner units and spacing means, made and arranged to be assembled to said main body via the axles in place of the four wheels so as to constitute the snow-sled configuration.

2. The convertible coaster/sled as defined in claim 1, further comprising:
   snow-sled braking means for enabling user braking in the snow-sled configuration.

3. The convertible coaster/sled as defined in claim 2 wherein the single user control element comprises a handlebar assembly affixed to the steerable front axle support assembly.

4. The convertible coaster/sled as defined in claim 3, wherein said snow-sled braking means comprises a panel attached to said handlebar assembly by a user, made and arranged to extend downwardly in response to braking applied by a user to the handlebar assembly, by a user so as to provide braking capability by engaging oncoming snow when said convertible coaster/sled is deployed in the snow-sled configuration.

5. The convertible coaster/sled as defined in claim 3, wherein said coaster-wagon braking means comprises a pair of metal brake pads attached to said handlebar assembly, made and arranged to press against a circumferential portion of the two front wheels in response to braking force applied by a user to the handlebar assembly, by a user so as to provide frictional braking capability when said convertible coaster/sled is deployed in the coaster-wagon configuration.

6. A method of converting a coaster-wagon to a snow-sled, the coaster-wagon having four wheels, two axles each fitted at both axle-ends with wheel-retaining means, and a brake mechanism, including a handlebar to which are attached a pair of brake shoes, made and arranged to apply braking by urging the brake shoes against a pair of the wheels in response to torque applied to the handlebar by a user for braking, comprising the steps of:
   (a) removing the wheel-retaining means from the axle-ends;
   (b) removing the wheels from the axles;
   (c) replacing each removed wheel with a snow-sled runner unit engaging a corresponding axle-end;
   (d) securing each snow-sled runner unit in place by re-installing the wheel-retaining means at the axle-ends: and
   (e) attaching to the handlebar a sled brake panel made and arranged to rotate in a downward direction, in response to the torque applied to the handlebar by a user for braking, so as to provide a braking action by engaging oncoming snow during forward motion of the snow-sled.

7. The method of converting a coaster-wagon to a snow-sled as defined in claim 6 comprising, following step (c), the further step of:
 (c1) installing, on an extending region of each axle-end, a spacer made and arranged to fill a void caused by lesser thickness of the runner units relative to the wheels in mounting regions thereof.

8. A method of converting a coaster-wagon to a snow-sled, the coaster-wagon having a main body fitted with four wheels, two axles each fitted at both ends with wheel-retaining means, and a brake mechanism, including a handlebar to which are attached a pair of brake shoes, made and arranged to apply braking by urging the brake shoes against a pair of the wheels in response to torque applied to the handlebar by a user for braking, comprising the steps of:
 (a) removing the wheel-retaining means from the axle-ends;
 (b) removing the wheels from the axles;
 (c) removing the axles from the main body;
 (d) replacing each removed wheel with a snow-sled runner unit engaging a corresponding axle-end; and
 (e) inserting a bolt through a hole provided in each runner unit and through corresponding openings in the main body vacated by the axles;
 (f) securing each runner unit to the main body by threading and tightening a nut onto each bolt inserted in step (e); and
 (g) attaching to the handlebar a sled brake panel made and arranged to rotate in a downward direction in response to the torque applied to the handlebar by a user for braking, so as to provide a braking action by engaging oncoming snow during forward motion of the snow-sled.

* * * * *